United States Patent [19]

Serafin

[11] 4,154,001
[45] May 15, 1979

[54] ELECTRIC HAND DRILL ALIGNING LEVEL

[76] Inventor: Joseph W. Serafin, 222 Flat Hills Rd., Amherst, Mass. 01002

[21] Appl. No.: 864,783

[22] Filed: Dec. 27, 1977

[51] Int. Cl.² .......................... G01C 9/28; G01C 9/36
[52] U.S. Cl. ..................................................... 33/373
[58] Field of Search ......................... 33/334, 370–373, 33/390

[56] References Cited

U.S. PATENT DOCUMENTS

| | | |
|---|---|---|
| 2,756,512 | 7/1956 | Pettit ..................................... 33/372 |
| 2,757,458 | 8/1956 | Zipser .................................... 33/373 |
| 2,806,296 | 9/1957 | Weichert ............................ 33/372 X |
| 3,030,710 | 4/1962 | Fell ........................................ 33/390 |
| 3,807,051 | 4/1974 | Funakubo .............................. 33/334 |

FOREIGN PATENT DOCUMENTS 981248  5/1951  France ........................................ 33/370

Primary Examiner—Charles E. Phillips
Attorney, Agent, or Firm—Dike, Bronstein, Roberts, Cushman & Pfund

[57] ABSTRACT

The combination with an electric drill of a spirit level, a foot provided with a spindle, the axis of which is at right angles to the surface of the foot by means of which the foot may be mounted in the drill chuck with its surface at right angles to the axis of the drill and a band encircling the electric drill, said band mounting the spirit level thereon such as to enable positioning the bubble in the level at a predetermined position for the angle of the shaft relative to the plane surface to be drilled such that when the foot is replaced by a drill, the drill may be positioned at said angle to said surface by positioning the bubble at said predetermined position.

1 Claim, 6 Drawing Figures

ELECTRIC HAND DRILL ALIGNING LEVEL

BACKGROUND OF THE INVENTION

The use of spirit levels for positioning drills is known in the art; however, such use is restricted in its effectiveness to the drilling of holes in horizontal surfaces. It is the purpose of this invention to provide for an effective use of a spirit level to enable drilling holes at any required angle and regardless of the angular position of the surface of the work to be drilled.

SUMMARY OF THE INVENTION

As herein illustrated, the invention resides in the combination with a drill, embodying a motor housing containing a motor, a motor shaft and chuck at the distal end of the shaft for receiving a drill; a spirit level, a foot adapted to be fixed in the chuck, said foot having a flat surface, the plane of which is situated at a predetermined angle to the axis of the shaft, and means adjustably mounting the spirit level on the motor housing so as to enable shifting the bubble of the spirit level to a predetermined position for a predetermined position of the axis of the shaft to the plane of the surface to be drilled such that when the foot is replaced by a drill, the drill may be aligned at said angular position with respect to the surface to be drilled by repositioning the bubble at said predetermined position. In the preferred form, the surface of the foot is perpendicular to the axis of rotation of the shaft. The means adjustably mounting the spirit level on the motor housing provides for movement of the face of the spirit level about an axis spaced radially from the center of the housing which lies in a plane perpendicular to the axis of the shaft and for movement of the spirit level circularly around the motor housing. Specifically, the aforesaid means comprises a flexible band encircling the motor housing comprising two flexible arcuate hands of a circumferential length extending the major distance around the circumference of the housing, a yoke connected to two of the adjacent ends of the bands, said level being mounted to the yoke, and a screw threaded part connecting the other two adjacent ends of the bands. A tongue extends radially from the yoke and a bifurcated part enbracing said tongue and connected thereto by a bolt passing through the bifurcations and the part which may be tightened to fix the angular position of the tongue and the bifurcated part provides for mounting the spirit level with its face in a plane at right angles to the axis of the drill.

The invention will now be described in greater detail with reference to the accompanying drawings, wherein.

Figure 1:
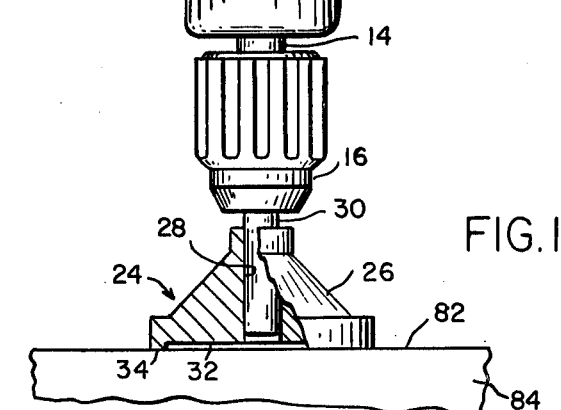
FIG. 1 is an elevation of a conventional electric drill provided with the attachments which, in combination, comprise the invention herein.
Figure 3:
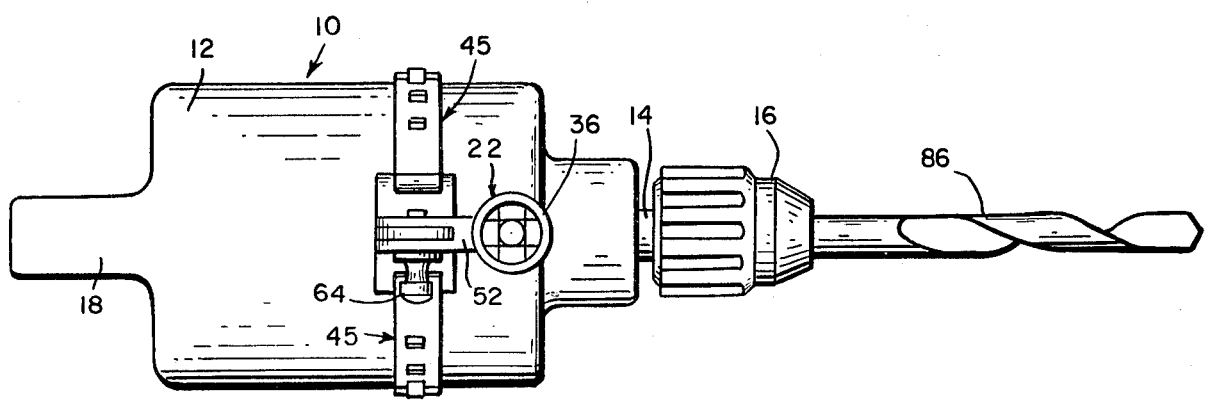
FIG. 3 is an elevation as seen from the right side of FIG. 1 with a drill replacing the foot.

According to the invention, FIG. 1 and 3, there is shown an electric drill 10 comprising a conventional motor housing or jacket 12 within which there is an electric motor, not shown, from the lower end of which extends a motor shaft 14 provided with a chuck 16 by means of which a drill may be fixed in place. The upper end of the housing 12 is provided with a handle 18 and within the opening of the handle, a trigger 20 by means of which the motor is started and stopped.

In accordance with this invention, there is provided, in combination with the aforesaid conventional electric drill, a spirit level device 22 and a positioning foot device 24.

The foot positioning device 24 comprises a rigid, somewhat conical structure 26, the bottom face of which is of circular configuration and contains a central hole 28 therein perpendicular to the foot within which there is fixed a spindle 30 of a dimension bo be received within the chuck 16 and fixed therein. The bottom face of the foot 26 contains a circular recess 32 of somewhat smaller diameter than the face so that there is an annular surface 34 peripherally of the foot.

Figure 5:
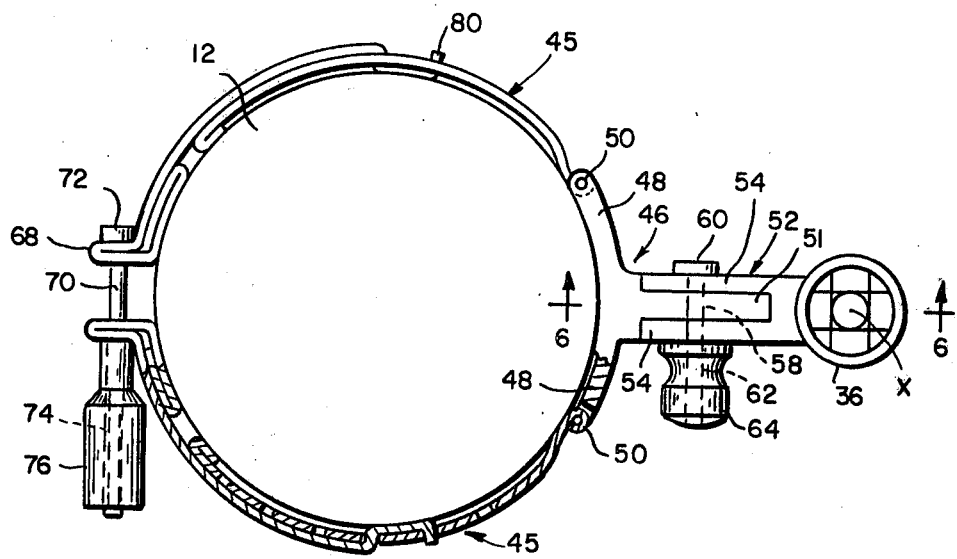
FIG. 5 is a horizontal section taken on the line 5—5 of FIG. 1.
Figure 6:
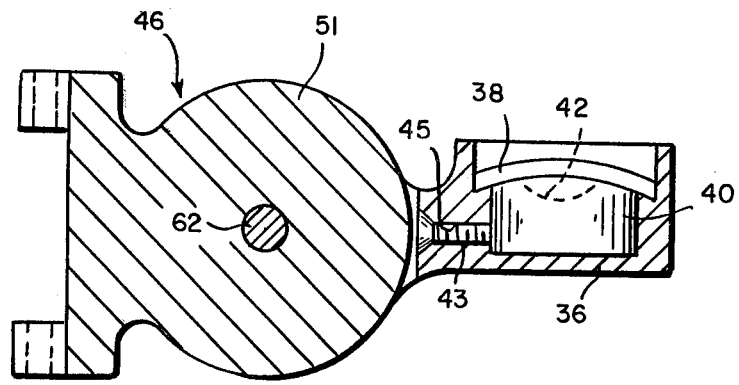
FIG. 6 is an enlarged section taken on the line 6—6 of FIG. 5.

The spirit level device 22, FIG. 6, is of conventional kind comprising a cup 36 closed at the top by a transparent lens 38 of suitable thermoplastic or glass within which there is a liquid 40 in a quantity to provide the usual bubble 42. A screw 43 screwed into a hole 45 in the spirit level cup provides for filling or emptying the cup when desirable. On the surface of the lens, there are, as shown in FIG. 5, quadrilaterally arranged scratch marks 44 which define the central area with reference to the center.

Figure 2:
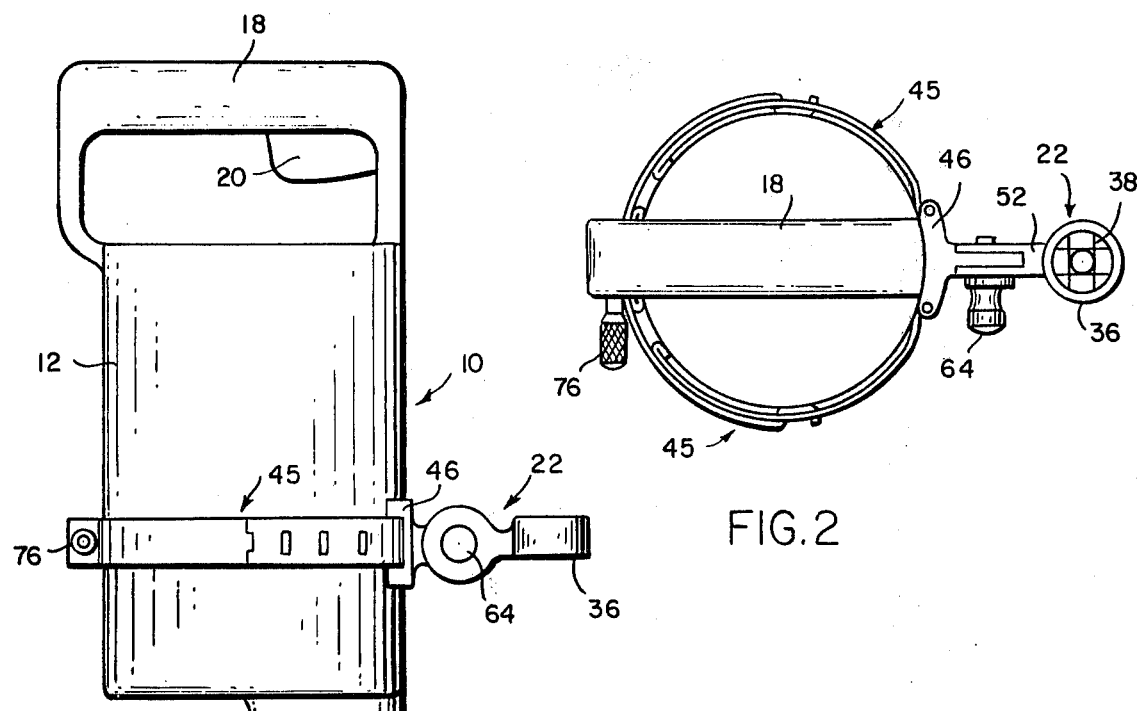
FIG. 2 is a plan view of FIG. 1.
Figure 4:
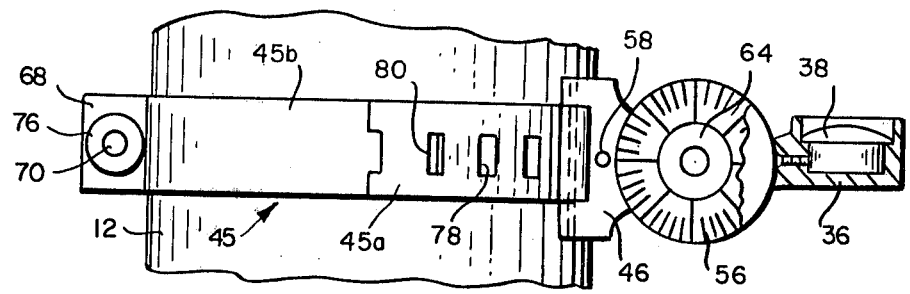
FIG. 4 is a fragmentary elevation to larger scale of the means for attaching the spirit level to the motor housing.

The spirit level cup 36 is adjustably attached to the motor housing at a suitable place intermediate the top and bottom thereof by means which enable moving the entire spirit level circularly around the axis of the housing in a horizontal plane and for angular adjustment of the surface of the spirit level, about a horizontal axis which is radially spaced from the center of the housing and lies in a horizontal plane at right angles to the axis of the housing and of the axis of the motor shaft. The aforesaid means comprise a band made up of two flexible arcuate portions 45—45, FIGS. 4 and 5, which extend the major part of the way around the circumference of the housing. A yoke 46 provided with arms 48-48 is pivotally connected by pins 50—50 to two of the ends of the flexible bands 45—45. Tongue 51 extends radially from the arms 48—48 and a bifurcated part 52 is pivotally mounted to the tongue 51 by means of a bolt 58 which extends through holes in the bifurcated portions 54—54 of a part 52 and the tongue 51. One end of the bolt 58 is provided with a head 60 and at its other end with threads 62 for receiving a knurled nut 64. The outer faces of the bifurcations 54—54 are provided with scales divided into degrees divisions 56 and there is a reference mark 58 to enable determining the degree of rotation of the spirit level. The spirit cup 36 is integral with the part 52 as shown in FIGS. 2 and 5.

The opposite ends of the arcuate portions of the band are provided with opposed outturned flanges 68—68 for receiving a bolt 70 having at one end a head 72 and at its other end threads 74 on which there is mounted a knurled adjusting nut 76 by means of which the band may be drawn tightly about the housing of the drill. The arcuate portions of the band are adjustable in length, each arcuate portion comprising a part 45a containing holes 78 and a part 45b provided with a tongue 80 for engagement with one of the holes to thus determine the length of the arcuate portion.

It is simple enough to drill holes at predetermined angles to a horizontal or vertical surface using a spirit level alone. However, it is absolutely necessary to use the foot 24 illustrated herein in combination with a spirit level to drill holes at predetermined angles in surfaces which are not prefectly horizontal or vertical. With the aid of the foot, this is accomplished by clamping the foot in the drill chuck, holding the electric drill so that the foot is firmly engaged with the surface to be drilled and then manipulating the spirit level until the bubble is centered within the scribed marks. The angle through which the spirit level is moved to bring the bubble into the centered position is noted. Now, by substituting the drill for the foot and adding or subtracting the angle through which the spirit level was moved to the angle at which the hole is to be drilled, the hole can be accurately drilled at the desired angle by placing the drill bit in engagement with the surface and with the end of the drill bit as the pivot point, moving it relative to the surface until the bubble is again centered.

It should be remembered that the present disclosure is for the purpose of illustration only and includes all modifications or improvements which fall within the scope of the appended claims.

I claim:

1. The combination with a drill embodying a motor housing containing a motor, a motor shaft and a chuck at the distal end of the shaft for receiving a drill, a spirit level, a foot adapted to be fixed in the chuck, said foot having a flat surface and containing a circular recess concentric with its center such that there is an annular surface peripherally of the foot, the plane of which is situated at a predetermined angle to the axis of the shaft, means adjustably mounting the spirit level on the motor housing so as to enable moving the bubble to a predetermined position for the angle of the shaft relative to the plane of the surface to be drilled such that when the foot is replaced by a drill, the drill may be positioned at said angle with respect to the surface of the drill by positioning said bubble at said predetermined position, said means adjustably mounting the spirit level to the motor housing for movement of the face of the spirit level about an axis spaced radially from and perpendicular the axis of the shaft comprising two flexible arcuate bands of a circumferential length to extend the major distance around the circumference of the housing, each of which comprises a two piece arrangement wherein one piece contains holes and the other piece contains a tongue for engagement with a selected one of said holes to provide an adjustable length, a yoke of concave arcuate configuration connected at its ends to two of the adjacent ends of the bands, a screw threaded part connecting the other two adjacent ends of the bands, a tongue extending radially from the yoke, a bifurcated part embracing the tongue and connected thereto by a bolt passing through the bifurcations and the tongue which may be tightened to fix the angular position of the tongue and bifurcated part relative to each other, said spirit level being mounted to the bifurcated with the plane of its face at right angles to the axis of the motor and said spirit level having on it quadrulaterally arranged scratch marks defining the area for centering the bubble.

* * * * *